United States Patent
Belletto et al.

(10) Patent No.: US 11,063,468 B2
(45) Date of Patent: Jul. 13, 2021

(54) METHOD FOR THE OVERLAP-FREE TRANSFER OF ELECTRIC POWER SOURCES AND SOURCE CHANGEOVER SWITCH IMPLEMENTING SUCH A METHOD

(71) Applicant: Schneider Electric Industries SAS, Rueil Malmaison (FR)

(72) Inventors: Jean-Luc Belletto, Gresse en Vercors (FR); Pascal Reymond, Voreppe (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 27 days.

(21) Appl. No.: 16/456,088

(22) Filed: Jun. 28, 2019

(65) Prior Publication Data

US 2020/0052525 A1    Feb. 13, 2020

(30) Foreign Application Priority Data

Aug. 9, 2018    (FR) ..................................... 18 57401

(51) Int. Cl.
*H02J 9/06* (2006.01)
*H02J 3/38* (2006.01)

(52) U.S. Cl.
CPC ................ *H02J 9/061* (2013.01); *H02J 3/38* (2013.01)

(58) Field of Classification Search
CPC .... H02J 9/06; H02J 9/061; H02J 9/062; H02J 3/38
USPC ........................................................ 307/66
See application file for complete search history.

(56) References Cited

U.S. PATENT DOCUMENTS

| 5,111,059 | A | | 5/1992 | Woodworth | |
|---|---|---|---|---|---|
| 6,051,893 | A | * | 4/2000 | Yamamoto | H02J 9/06 307/43 |
| 6,137,191 | A | * | 10/2000 | O'Leary | H02J 3/005 307/125 |
| 9,570,253 | B1 | | 2/2017 | Hamiliton | |
| 2008/0054722 | A1 | * | 3/2008 | Phelps | H02J 9/061 307/64 |
| 2016/0233720 | A1 | | 8/2016 | Lee et al. | |
| 2017/0090549 | A1 | | 3/2017 | Wang et al. | |
| 2017/0154745 | A1 | | 6/2017 | Hamilton | |
| 2017/0366040 | A1 | | 12/2017 | Gould | |

FOREIGN PATENT DOCUMENTS

CN    103683469    3/2014
EP    0 471 178 A2    2/1992

OTHER PUBLICATIONS

French Search Report dated Apr. 15, 2019 in French Application 18 57401, filed on Aug. 8, 2018 (with English Translation of Categories of Cited Documents & Written Opinion).

* cited by examiner

*Primary Examiner* — Hal Kaplan
(74) *Attorney, Agent, or Firm* — Oblon, McClelland, Maier & Neustadt, L.L.P.

(57) ABSTRACT

The invention relates to a method for transferring, during a predetermined transfer duration, the electric power supply of an electric distribution line (7) from a first source (1) to a second source (2), without overlapping of the two sources. The invention also relates to a source inverter implementing such a method.

16 Claims, 8 Drawing Sheets

METHOD FOR THE OVERLAP-FREE TRANSFER OF ELECTRIC POWER SOURCES AND SOURCE CHANGEOVER SWITCH IMPLEMENTING SUCH A METHOD

TECHNICAL FIELD

The invention relates to a method for transferring the electric power supply of an electric distribution line from a first source to a second source. The invention also relates to a source inverter intended to command at least one first switch and one second switch for connecting, without overlapping, electric power sources to a power distribution line.

PRIOR ART

The availability of electric power is important, for example, for continuous-flow production industries. Indeed, an electric power supply outage can result in disruptions that could result in the shutdown of a production line. In order to provide a secure power supply and to avoid such consequences, a device that is generally called "source inverter" is used: as soon as a first power source exhibits a risk of being lost, for example, due to overheating of an MV/LV transformer, the source inverter switches the incoming supply of the electric power to a second power source. This second source is an output of a redundant transformer of the electric installation, or a backup electric line, or even an autonomous generator. Transferring the electric power supply source from a first source to a second source requires synchronization of the first source and of the second source, i.e. the amplitude and the phase of the first source and of the second source must be identical, or within certain limits, at the time of the switchover. However, even in this case, significant disruptions can occur when motors are connected to the power supply line. Indeed, when the power supply of an electric motor is lost, the mechanical inertia of the motor and its load, as well as the magnetic remanence of the rotor, bring the motor to a generator operating mode, which tends to compensate the lost source. The rotation speed of the motor decreases fairly quickly as a function of the resistive torque that opposes the inertia of the motor and the load combined. The frequency and the phase of the voltage supplied by the motor deviates from the frequency and the phase of the network. A resupply from an energy source with a different frequency and/or phase causes overvoltages, overintensities and mechanical jerking that can affect the motor or the electric installation. The effects are further compounded when several motors are powered by the same power source. Therefore, it is crucial that the source is transferred as quickly as possible, preferably during a predetermined transfer duration, that is long enough so that the transient phenomena associated with the disconnection of a source can be removed or significantly reduced, and is short enough so that the one or more motor(s) do not have time to slow down too much. A transfer duration of several tens of milliseconds is optimal for industrial power equipment comprising motors.

Document US 2014/001860 A1 discloses a method for transferring sources comprising a measurement of the electric parameters, then a computation of the voltage and phase deviations between the voltage of the backup source and the voltage generated by the motor. This method requires measurements of electric, voltage and phase parameters and commands a transfer for a phase deviation that can be up to 90°. Such a phase deviation can be the source of significant disruptions with respect to the operation of high-power motors.

Document EP 1014534 A1 discloses a source inverter capable of transferring the sources in a minimum amount of time and to this end implements fast switches. The system does not take into account the opening and closing times of the switches, which can lead to a "closed" transition, i.e. the faulty main source and the backup source are briefly connected together for the time needed to switch sources, which can be the source of overintensities in some parts of the electric circuit. Furthermore, the cost of a fast switch is much higher than the cost of a standard switch and the duration for transferring sources, even though it is low, cannot be limited to only a few tens of milliseconds.

The aim of the invention is a method and a device for inverting sources for loads such as high-power motors, allowing a fast switchover from a faulty source to a backup source to be ensured, or conversely when the faulty source has regained its nominal properties.

DISCLOSURE OF THE INVENTION

The invention relates to a method for transferring, during a predetermined transfer duration, the electric power supply of an electric distribution line from a first source to a second source, without overlapping of the two sources, a first switch, which is connected, on the one hand, to the first source and, on the other hand, to the distribution line, being commanded to close or open in order to connect or disconnect the first source to/from the distribution line, a second switch, which is connected, on the one hand, to the second source and, on the other hand, to the distribution line, being commanded to close or open in order to connect or disconnect the second source to/from said distribution line, such that:
  either a first delay time is applied before a command for opening the first switch;
  or a second delay time is applied before a command for closing the second switch;
  the first delay time or the second delay time being computed so that the time interval between a disconnection of the first source and a connection of the second source is equal to the transfer duration.

Advantageously, the method comprises a step of computing:
  an average value of a first operation duration for connecting the first source to the distribution line;
  an average value of a second operation duration for connecting the second source to the distribution line;
  an average value of a third operation duration for disconnecting the first source from the distribution line; and
  an average value of a fourth operation duration for disconnecting the second source from the distribution line.

Advantageously, the first delay time is applied before the command to open the first switch, when the second operation duration for connecting the second source is greater than the sum of the third operation duration for disconnecting the first source and of the transfer duration.

Preferably, the first delay time is equal to the second operation duration for connecting the second source, less the sum of the third operation duration for disconnecting the first source and of the transfer duration.

Advantageously, the second delay time is applied before the command to close the second switch, when the second operation duration for connecting the second source is less than the sum of the third operation duration for disconnecting the first source and of the transfer duration.

Preferably, the second delay time is equal to the sum of the third operation duration for disconnecting the first source and of the transfer duration, less the second operation duration for connecting the second source.

Preferably, the transfer duration is between 10 ms and 50 ms.

Preferably, an observation window of a predetermined observation duration is opened at the same time as the command to close the second switch.

Preferably, the opening of the second switch is commanded when a closure indicator of the second switch is not delivered during the observation duration.

Preferably, the closure indicator of the second switch is delivered during the execution of a movement to close the contacts of said second switch.

According to a first variant, the closure indicator of the second switch is delivered when the contacts of said second switch are closed.

According to a second variant, the closure indicator of the second switch is delivered when the contacts of said second switch are no longer open.

A further aim of the invention is a source inverter intended to command at least one first switch and one second switch for transferring, without overlapping, the electric power supply of a power distribution line from a first source to a second source, the first switch comprising at least:

one first closure actuator for commanding a closure operation of the first switch;
one first opening actuator for commanding an opening operation of the first switch; and
one first sensor for supplying a first signal indicating the closure of the first switch, the second switch comprising at least:
one second closure actuator for commanding a closure operation of the second switch;
one second opening actuator for commanding an opening operation of the second switch; and
one second sensor for supplying a second signal indicating the closure of the second switch, the source inverter comprising:
at least one first connection connected to the first sensor for receiving a first signal indicating the closure of the first switch and one second connection for receiving a second signal indicating the closure of the second switch;
at least one third connection for commanding the first opening actuator and one fourth connection for commanding the second opening actuator;
at least one fifth connection for commanding the first closure actuator and one sixth connection for commanding the second closure actuator; and
a processing unit for implementing the connection method as previously described.

Preferably, the first and second closure actuators of the first and second switches are activated by a direct voltage and the source inverter transmits a direct voltage over the fifth and sixth connections for respectively commanding the first and second closure actuators of the first and of the second switch.

Preferably, the first and second opening actuators of the first and second switches are activated by a direct voltage and the source inverter transmits a direct voltage over the third and fourth connections for respectively commanding the first and second opening actuators of the first and of the second switch.

The invention also relates to an electric switch intended to be commanded by a source inverter as previously described, said switch comprising:
at least one upstream connection terminal intended to be connected to a source supplying electric power;
at least one downstream connection terminal intended to be connected to an electric power distribution line;
electric contacts for establishing or interrupting the circulation of power between at least the upstream terminal and the downstream terminal;
an opening actuator for activating a mechanism for opening the electric contacts;
a closure actuator for activating a mechanism for closing the electric contacts;
said switch being such that the activation of the mechanism for opening the electric contacts acts on the mechanism for closing the contacts in order to interrupt a closure movement of said contacts.

BRIEF DESCRIPTION OF THE DRAWINGS

Further advantages and features will become more clearly apparent from the following description of particular embodiments of the invention, which are provided by way of non-limiting examples, and with reference to the accompanying drawings, in which:

FIGS. 5A to 5G show timing diagrams for commanding the switches, for the appearance of signals and for states of the sources in a case of the transferral of the power supply in which a predetermined transfer duration cannot be complied with;

DETAILED DESCRIPTION OF PREFERRED EMBODIMENTS

Figure 1:
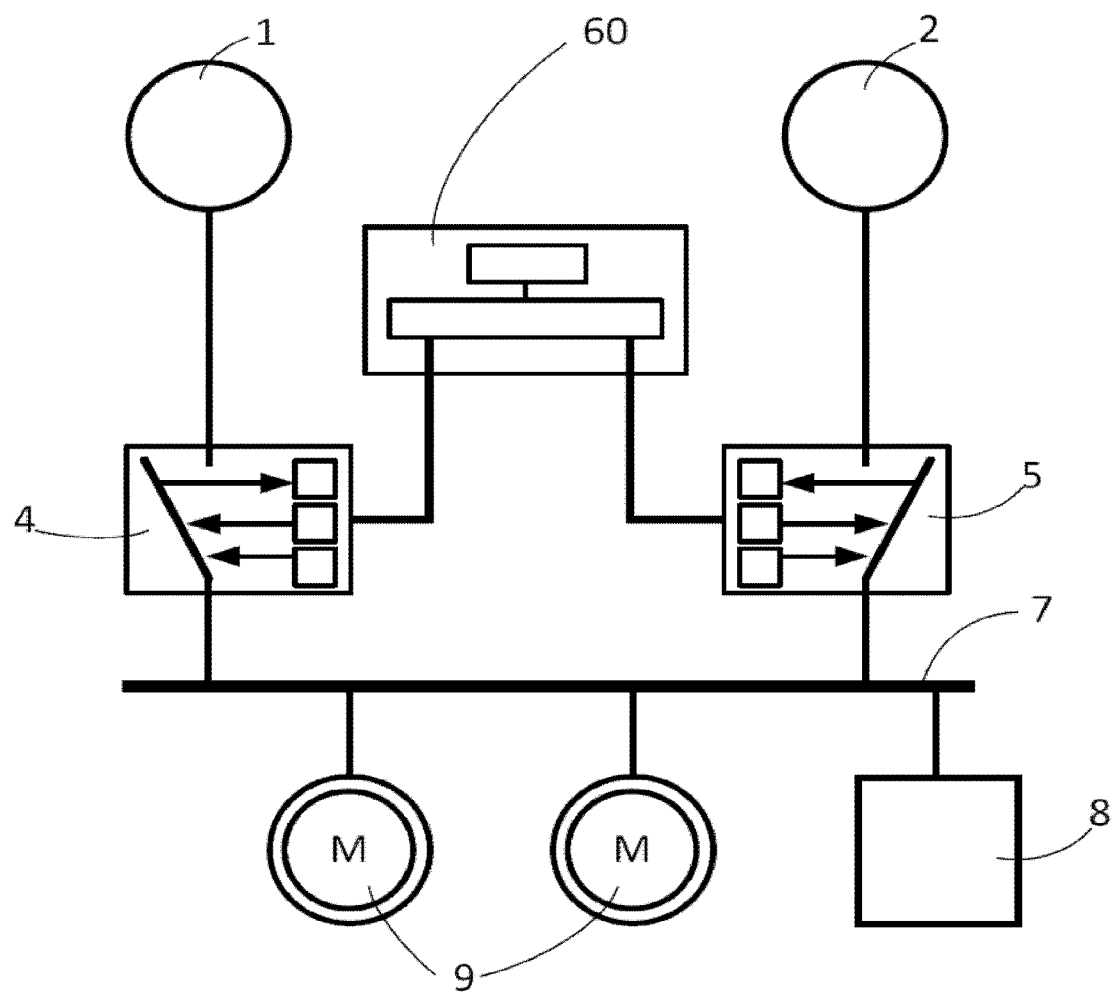
FIG. 1 is a schematic representation of a first configuration of an electric installation allowing a transfer from a first source to a second source by means of two switches.

FIG. 1 is a conventional schematic representation of an electric installation comprising a source inverter. A first source 1 supplies electric power to one or more loads 8, 9. The first source can be, for example, an electric power distribution network or an output of an MV/LV transformer. A first load type 8 is made up of an item of equipment or a set of several items of electric equipment. A second load type 9 is made up of motors. A first switch 4, connected upstream of the first source 1 and downstream of a distribution line 7, for example, a busbar, is commanded in order to close or open so as to connect or disconnect the first source 1 to/from the distribution line 7. The loads 8, 9 are connected to the distribution line 7. The first switch 4 is preferably a circuit breaker, but also can be a contactor or a relay. The switch 4 comprises contacts 41 for establishing or interrupting a connection between the first source 1 and the distribution line 7 and comprises actuators for commanding the opening and closing of the contacts 41.

Figure 2:
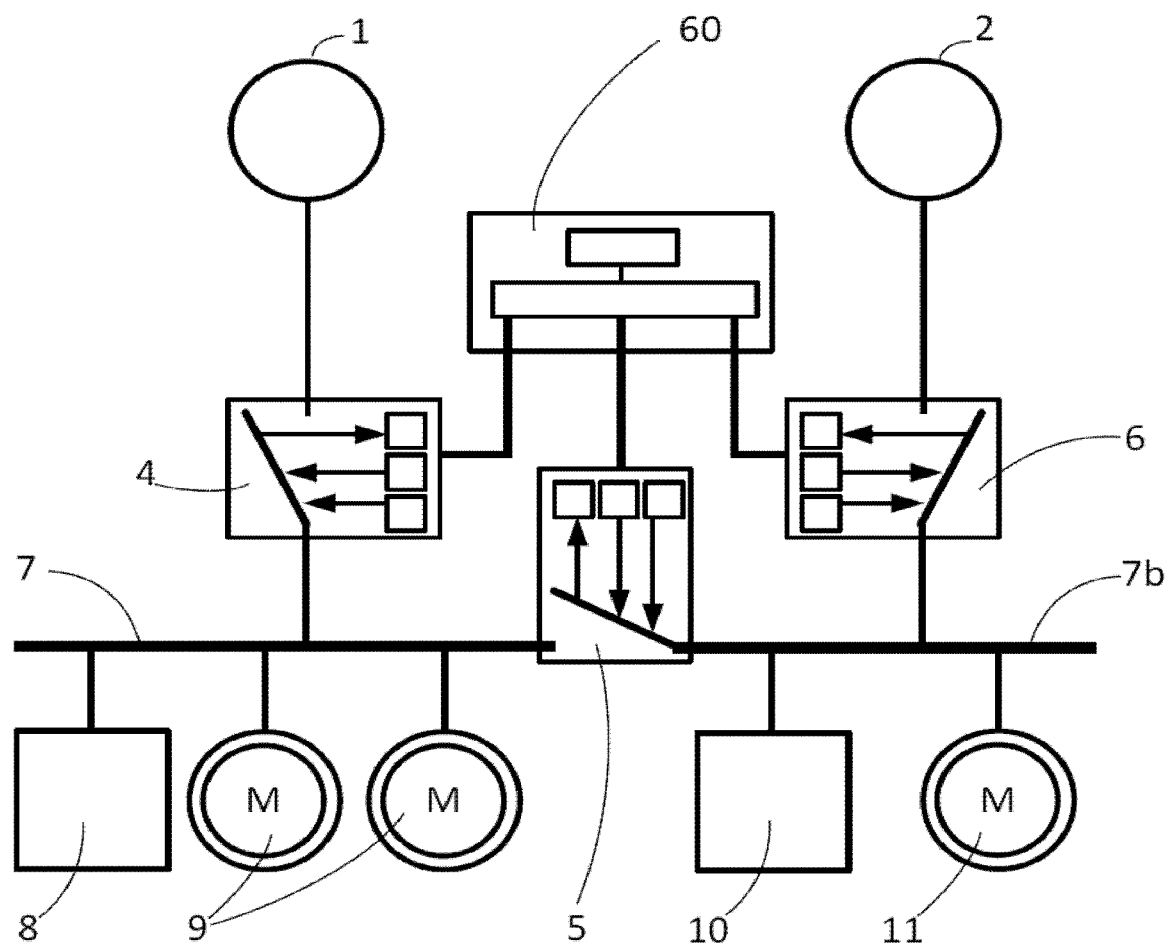
FIG. 2 is a schematic representation of a variant of a configuration of the electric installation allowing a transfer of sources.

In the event of scheduled unavailability or of a voluntary action of opening the first source 1, for example, following an overload upstream of the installation, a second electric power source 2 is used to continue to power the loads 8, 9. This second source can be, for example, a local generator, such as an electricity generator, a second electric line or even an output of a redundant transformer of the electric installation. A second switch 5, connected upstream of the second source 2 and downstream of the distribution line 7, is commanded in order to close or open so as to connect or disconnect the second source 2 to/from said distribution line 7. In the event that the second switch 5 is closed in order to connect the second source 2 to the distribution line 7, the first switch 4 is opened so that there is no interaction between the first source 1 and the second source 2, particularly when the first source 1 becomes available again. The second switch 5 preferably is similar to the first switch 4. By way of a variant, as shown in FIG. 2, two electric networks are shown that are separated during normal operation. A first network comprising the first source 1 powers the first and second load types 8, 9 and a second network comprising the second source 2 powers third and fourth load types 10, 11. A third switch 6 allows the second source to be connected to the third and fourth load types 10, 11. The second switch 5 allows two portions of the distribution line 7, 7b to be connected in order to power all the loads when one of the sources is faulty. The method according to the invention can be applied to any configuration of an electric power distribution network, as long as two energy sources have to be switched within a short and reproducible time period, without overlapping of the sources.

In order to avoid any disruption from one source to the other, the first switch 4 is opened before the second switch 5 is closed in order to prevent any circulation of current, even briefly, between the first source 1 and the second source 2. This sequencing enables a source transfer that is called "without overlapping", i.e. the first source and the second source are never simultaneously connected together with the distribution line 7. Furthermore, the method according to the invention guarantees a predetermined transfer time Tt, i.e. the contacts of the switch 5 are closed after a transfer duration Tt following the opening of the contacts of the first switch 4. Thus, motors connected to the distribution line 7 will not experience an interruption in their power supply that is greater than the transfer duration Tt. By optimizing this transfer duration, the motors experience minimum disruptions during the transferral of the source. However, if the transfer duration Tt cannot be complied with, then the source transfer operations are cancelled. Indeed, the consequences of deferred restarting of motors are generally less critical than an excessively long transferral of sources.

The operations for transferring sources also must be as short as possible in order for the transfer to be performed before the faulty source has been completely lost. Given the generally long operation duration, for example, when the switches are high-power circuit breakers, the opening of the first switch 4 is commanded at the same time as the closure of the second switch 5. In order to effectively rate the operations by taking into account durations that are necessary for the various operations and in accordance with the transfer duration Tt, the method comprises a prior step of measuring an average of the operation durations of the switches. An operation duration corresponds to the elapsed time between the instant at which a command is given and the instant at which the contacts of the commanded switch are in the state demanded by the command. An operation duration is of the order of a few tens of milliseconds for the switches. For the same switch, an operation duration for opening electric contacts is different from an operation duration for closing said electric contacts. In general, the opening operation duration is less than the closing operation duration. Furthermore, the duration of a given operation is subject to variability that is related to the mechanical operation of the switch executing said operation. In order to limit this variability, the method of the invention comprises a step 100 of computing an average value of a first operation duration Tmc1 for connecting the first source to the distribution line 7, an average value of a second operation duration Tmc2 for connecting the second source to the distribution line 7, an average value of a third operation duration Tmd1 for disconnecting the first source from the distribution line 7, and an average value of a fourth operation duration Tmd2 for disconnecting the second source from the distribution line 7. The computation of an average value of an operation duration is performed when the electric installation is powered off or when the loads 8, 9 are not connected. Said operation is repeated several times in order to obtain several measurements. A result of the computation of an average of the measurements is recorded by the method in order to be taken into account in the remainder of the connection method. It is also possible to use the duration that is most frequently measured during the series of operations.

Figure 3:
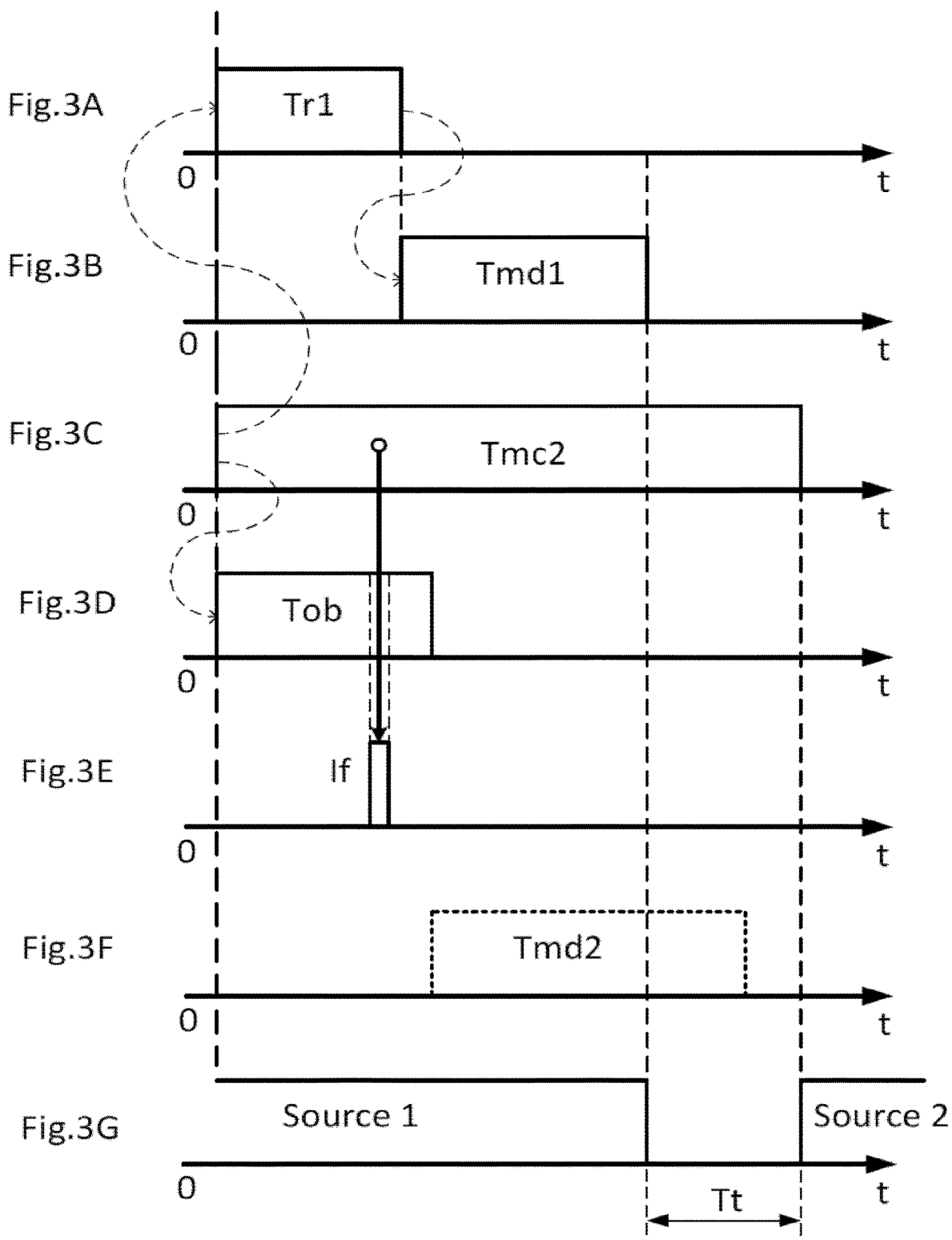
FIGS. 3A to 3G show timing diagrams for commanding the switches, for the appearance of signals and for states of the sources in a first case of fault-free transferral of the power supply.

FIGS. 3A to 3G show timing diagrams for commanding the switches in a first case of a power supply transferral during nominal operation, i.e. fault-free. FIG. 3G is a timing diagram showing the presence of the first source 1 and its loss during a transfer duration Tt, then the appearance of the second power supply source 2. In this example, and as shown in FIGS. 3B and 3C, the sum of the third operation duration Tmd1 for disconnecting the first source 1, i.e. for opening the first switch 4, and of the transfer duration Tt is less than the second operation duration Tmc2 for connecting the second source 2, i.e. for closing the second switch 5. In this case, as shown in FIG. 3A, a first delay time Tr1 is applied before the operation for disconnecting the first source 1, i.e. before a command of the first switch 4. At the same time, as shown in FIG. 3C, the operation for connecting the second source 2, which is the longest, is started at the time t=0. Thus, when the third operation duration Tmd1 for disconnecting the first source 1 is complete, a transfer duration Tt elapses before the operation for connecting the second source 2 is fully executed. The electric power supply of the distribution line 7 has been properly transferred, without overlapping, from the first source 1 to the second source 2. FIGS. 3A, 3B, 3C and 3G show that:

$$Tr1+Tmd1+Tt=Tmc2.$$

The third operation duration Tmd1 for disconnecting the first source 1 is measured, the second operation duration Tmc2 for connecting the second source 2 is also measured, the transfer duration Tt is selected, it is therefore easy to compute the value of the first delay time Tr1:

$$Tr1=Tmc2-(Tmd1+Tt).$$

In order to be applied, the first delay time Tr1 must be positive. Consequently, the following is necessary:

$$Tmc2-(Tmd1+Tt)>0,$$

and therefore:

$$Tmc2>(Tmd1+Tt).$$

Clearly, when Tmc2=(Tmd1+Tt), the first delay time Tr1 is zero and, consequently, the operation for disconnecting the first source 1 is launched at the same time as the operation for connecting the second source 2.

A similar operation is applied when the second operation duration Tmc2 for connecting the second source 2 is less than the sum of the third operation duration Tmd1 for disconnecting the first source 1 and of the transfer duration Tt. In this case, a second delay time Tr2 is applied before the operation for connecting the second source 2 by closing the second switch 5. This configuration is shown by the timing diagrams of FIGS. 4A, 4B, 4C and 4G. It is clear that:

$$Tmd1+Tt=Tr2+Tmc2,$$

from which it is easy to deduce that: Tr2=(Tmd1+Tt)−Tmc2.

In order to be able to be applied, the second delay time Tr2 must be positive and consequently:

$$(Tmd1+Tt)>Tmc2.$$

To summarize, when Tmc2>(Tmd1+Tt), then the first delay time Tr1 must be applied before launching the operation for disconnecting the first source 1, which corresponds to the opening of the first switch 4. When Tmc2<(Tmd1+Tt), then the second delay time Tr2 must be applied before launching the operation for connecting the second source 2 by closing the second switch 5. Thus, the time interval between the disconnection of the first source 1, corresponding to the opening of the first switch 4, and the connection of the second source 2, corresponding to the closing of the second switch 5, is equal to the transfer duration Tt. When Tmc2=(Tmd1+Tt), no delay time is applied, the operation for disconnecting the first source 1 is commanded at the same time as the operation for connecting the second source 2.

The selected transfer duration Tt is preferably between 10 milliseconds and 50 milliseconds.

The method comprises a possibility of cancelling the transfer of sources in the event that the transfer duration cannot be complied with. It is indeed important that the second source 2 is not connected if the transfer duration is greater than the predetermined transfer duration Tt. Indeed, beyond said predetermined transfer duration, the frequency and phase deviation between the second source 2 and the terminals of the motors 9 connected to the distribution line 7 can become excessive and, under these conditions, connecting the motors 9 to the second source 2 risks causing dangerous overintensities. To avoid this, a closure indicator If of the second switch is monitored. This indicator is delivered by the second switch 5 to indicate a state that is favourable for closure. The closure indicator If of the second switch 5 is delivered when the mechanism for closing the contacts of the second switch executes a closure operation. Preferably, an auxiliary circuit breaker contact, called "ready-to-close", also denoted using the acronym "RC", is used to provide the closure indicator. Other types of auxiliary contacts can be used to provide the closure indicator:

an auxiliary position contact of the "normally closed" type, also denoted using the acronym "NC", provides an indicator when the contacts of the switch are closed; or an auxiliary position contact of the "normally open" type, also denoted using the acronym "NO", provides an indicator as soon as the contacts of the switch are no longer open.

The "ready to close" contact delivers the closure indicator If before the other types of auxiliary contacts, which warrants a preferred use.

Figure 4:
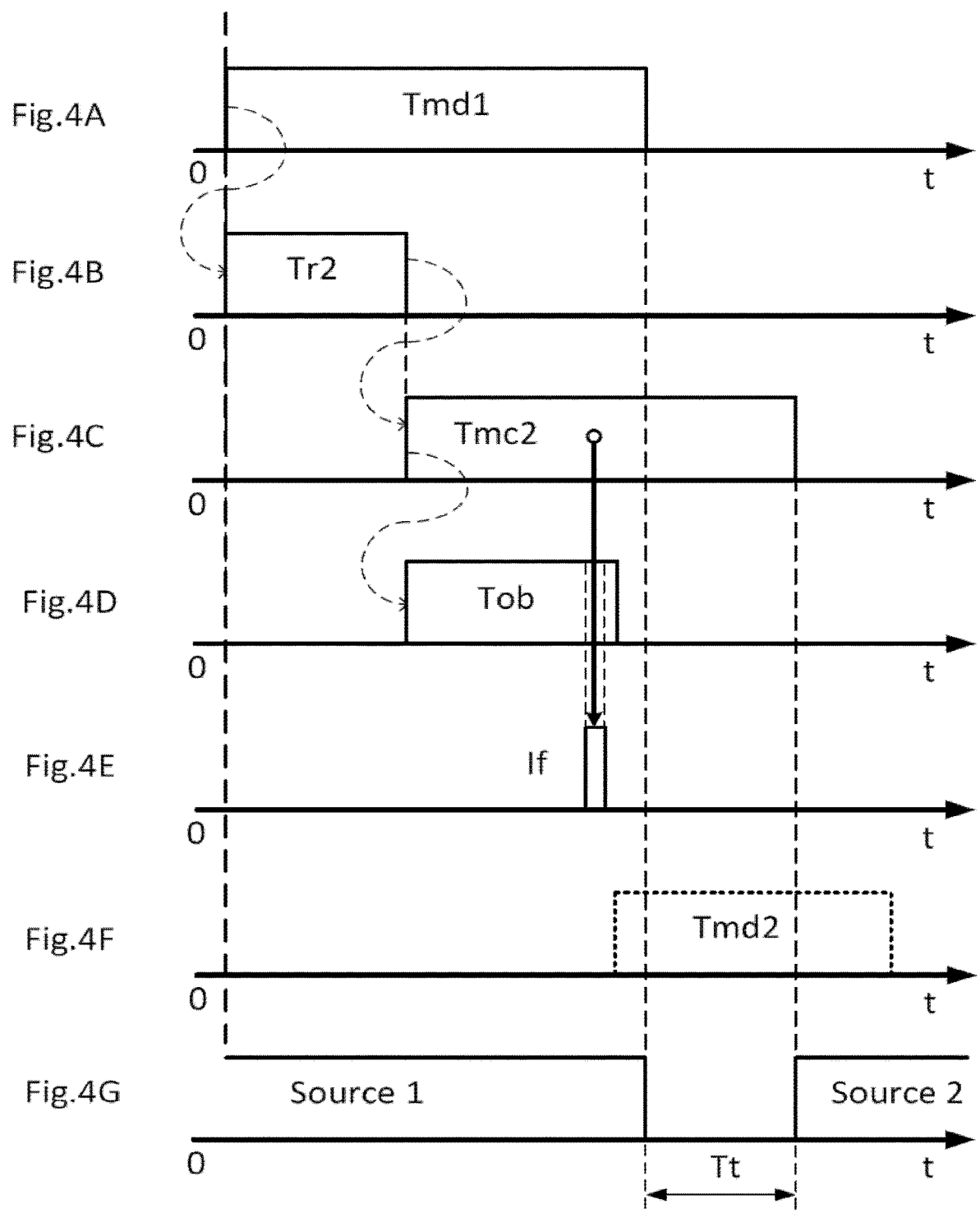
FIGS. 4A to 4G show timing diagrams for commanding the switches, for the appearance of signals and for states of the sources in a second case of fault-free transferral of the power supply.
Figure 5:
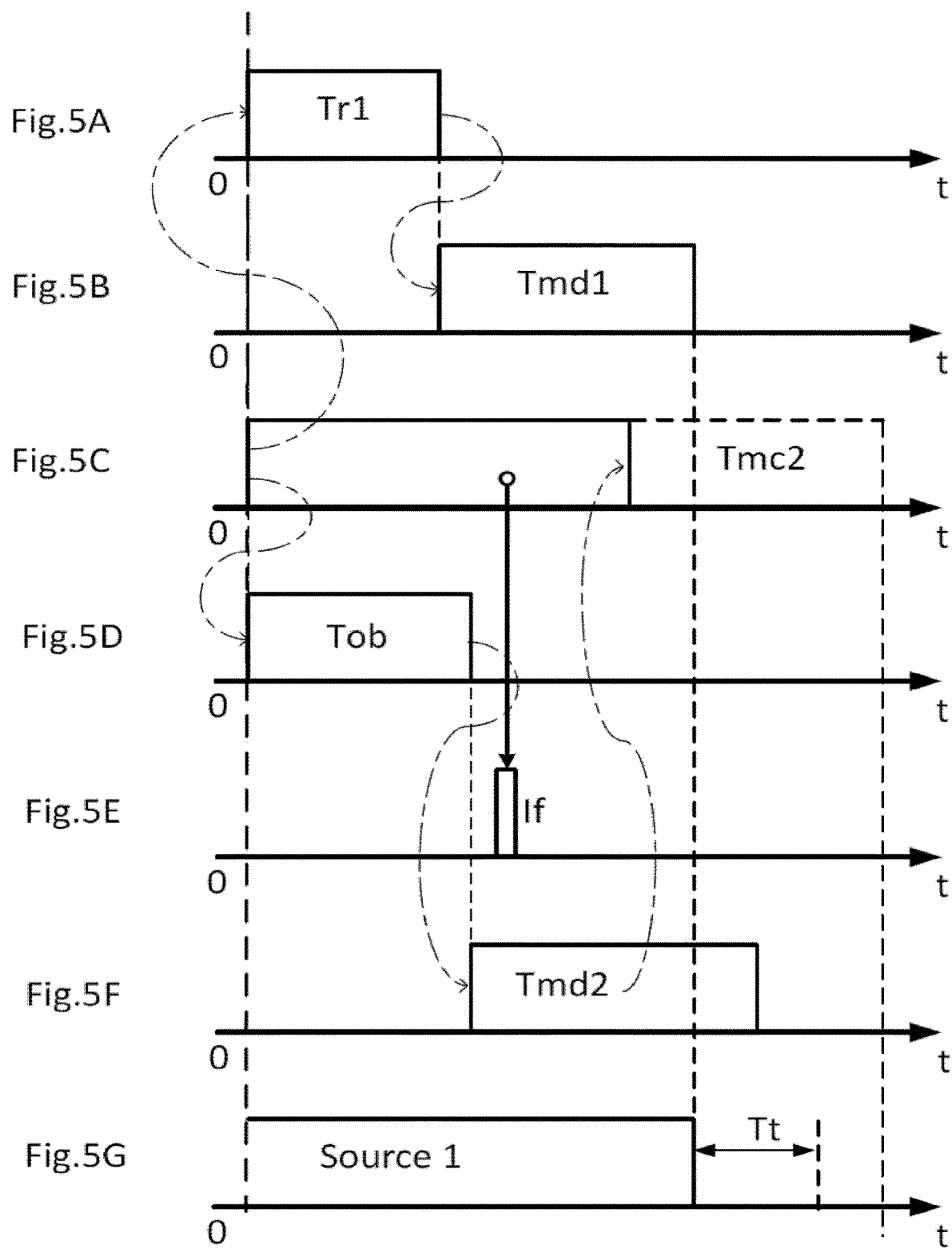

In a first scenario, the closure indicator If is delivered after a predetermined duration following a command to close the second switch. In order to be certain that the transfer duration Tt can be complied with, an observation window is opened, for an observation duration Tob, at the same time as a command to close the second switch 5, as shown in FIGS. 3D and 4D. When the closure indicator If is delivered during the observation duration Tob, the closure operation of the second switch can continue. When the closure indicator If of the second switch 5 is not delivered during the duration Tob of the observation time window, then there is probably a problem closing the second switch 5 and the opening of the second switch 5 is commanded so as not to connect the second source 2, according to a second scenario. The installation and the motors 9 are thus protected against overintensities and disruptions associated with a transfer duration that is greater than the predetermined transfer duration Tt. The second scenario is shown by the timing diagrams shown in FIGS. 5A to 5G, in which Tmc2>(Tmd1+Tt). The operation for connecting the second source 2 is started at the time t=0, as shown in FIG. 5C. The duration observation window Tob is opened at the same time as the command to close the second switch, as shown in FIG. 5D. The closure indicator If is delivered outside the observation window. The second switch 5 therefore has taken more time than expected to execute the closure operation, this is an abnormal situation, there is a fault. An operation for opening the second switch 5 is executed, as shown on the timing diagram of FIG. 5F, resulting in the abandonment of the operation for closing the second switch 5, as shown in FIG. 5C. Consequently, the first source 1 is disconnected, but no other source is connected to the distribution line 7, as shown in FIG. 5G. The method operates in the same way when the closure indicator If is not delivered.

The first scenario is shown by the timing diagrams shown in FIGS. 4A to 4G, in which Tmc2<(Tmd1+Tt). The second delay time Tr2 is launched before the operation for connecting the second source 2, as shown in FIGS. 4B and 4C, and, in the same way as for the second scenario, the duration observation window Tob is opened at the same time as the command to close the second switch, as shown in FIG. 4D. The closure indicator If is delivered during the duration Tob for opening the observation window, as shown in FIGS. 4D and 4E, the operation for closing the second switch can continue, as shown in FIG. 4C. The timing diagram in FIG. 4G shows the disconnection of the first source 1, then the source transfer period, followed by the connection of the second source 2. The timing diagram in FIG. 4F shows that the cancellation of the connection of the second source 2 has not been completed.

Figure 6:
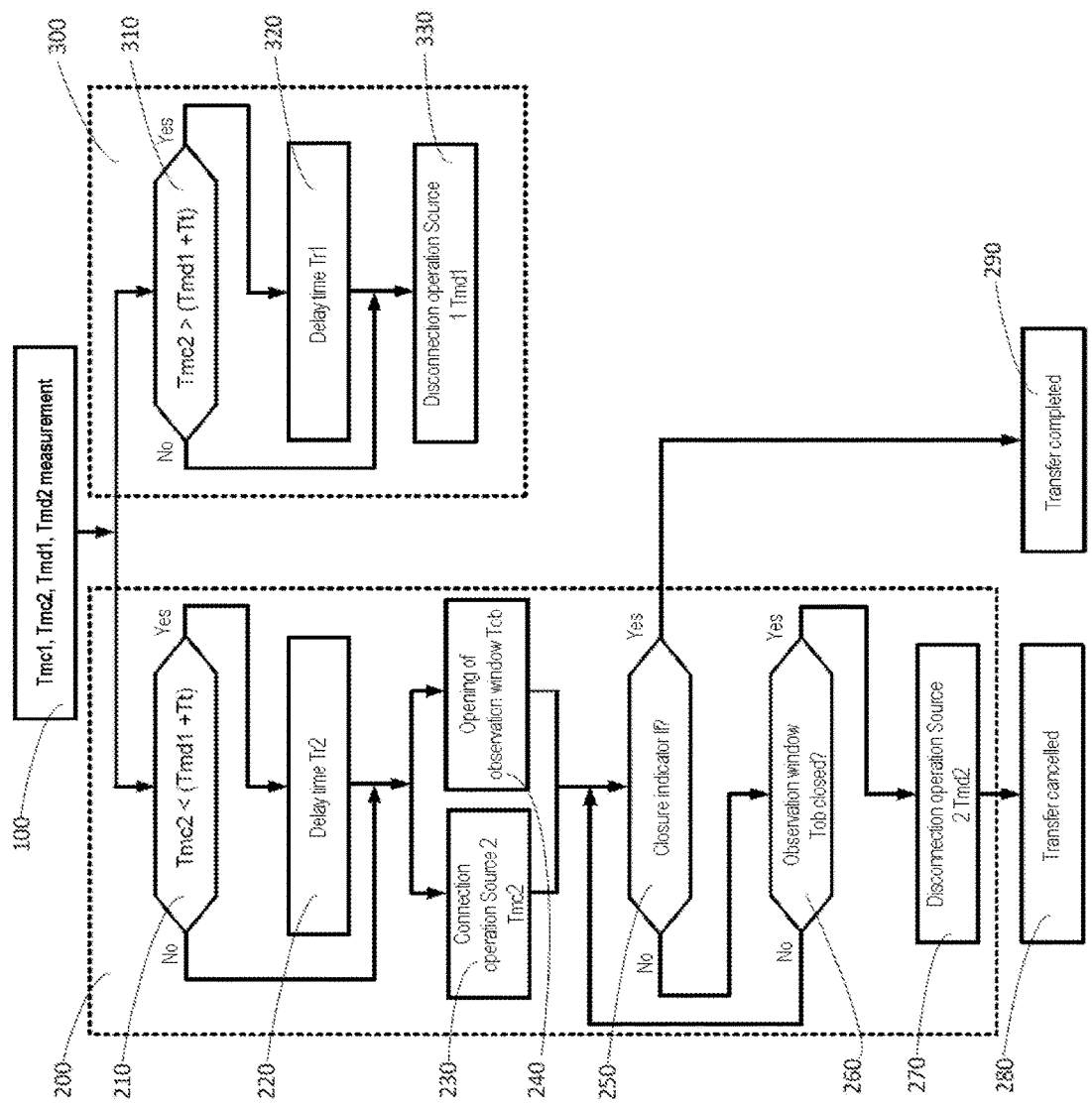
FIG. 6 shows, in the form of a flowchart, a method for commanding two switches in order to transfer an electric power supply from a first source to a second source.

The method for transferring the electric power supply of an electric distribution line 7 from the first source 1 to the second source 2, without overlapping, is shown in the form of a flowchart in FIG. 6. The method comprises the step 100 of measuring operation durations Tmc1, Tmc2, Tmd1, Tmd2 for connecting and disconnecting the first and the second source. This measurement step 100 is carried out when the electric installation is commissioned and can be carried out periodically in order to update the measurements and to take into account the wear of the equipment. The method continues with two phases that are initiated simultaneously and that run at the same time. A first phase 200 of connecting the second source 2 to the distribution line 7, which corresponds to the operation for closing the second switch 5, said first phase being conducted at the same time as a second phase 300 for disconnecting the first source 3 from the distribution line 7, which corresponds to the operation for opening the first switch 4.

The first phase 200 of connecting the second source 2 begins with a step 210 of testing whether Tmc2 is less than the sum (Tmd1+Tt). If so, the operation for connecting the second source 2 is quicker than the operation for disconnecting the first source 1, to which the transfer time Tt is added, then the method transitions to the step 220 of timing for the duration Tr2 equal to (Tmd1+Tt)−Tmc2. If not, the method continues to the step 230 corresponding to the launching of the operation for connecting the second source 2 and the step 240, executed at the same time as the step 230, corresponding to the opening of the observation window. During steps 250 and 260, the method monitors whether the closure indicator If is delivered during the duration Tob for opening the observation window. If so, the method ends with a step 290 corresponding to a source transfer that has been properly completed. If the closure indicator If has not been delivered during the duration Tob for opening the observation window, the method commands an operation for disconnecting the second source 2 during a step 270 and the method ends with a step 280 corresponding to a cancelled transfer of sources.

The second phase 300 of disconnecting the first source 3 from the distribution line 7 begins with a step 310 of testing whether Tmc2 is greater than the sum (Tmd1+Tt). If so, the method transitions to the step 320 of timing for the duration Tr1 equal to Tmc2−(Tmd1+Tt), then transitions to the step 330 at the end of the delay time Tr1. If not, the method continues directly to the step 330 corresponding to the launching of the operation for disconnecting the first source 1.

In the event that Tmc2=(Tmd1+Tt), the first phase 200 of connecting the second source 2 runs without transitioning to the step 220 of timing for the duration Tr2 and the second phase 300 runs at the same time without transitioning to the step 320 of timing for the duration Tr1.

The method that is the subject matter of the invention therefore allows the electric power supply of a distribution line 7 to be transferred from a first source 1 to a second source 2, during the predetermined and controlled transfer duration Tt, independently of the time required to operate the switches. In the event that the transfer duration Tt cannot be complied with, then the switchover of sources is cancelled. Obviously, the previously described method can be reversed in order to transfer the electric power supply of the electric distribution line from the second source to the first source, or even to transfer the electric power supply between two portions of the distribution line 7, 7b, as shown in FIG. 2, or any other configuration of an electric network.

A procedure for checking the opening of the first switch 4 could be performed during said disconnection operation. However, if the first source 1 does not disconnect, the source is transferred with overlapping. With the first source and the second source being synchronized, any disruptions experienced by the loads connected to the power supply line will be limited. However, protection must be implemented for limiting the mutual influence of the two sources.

Figure 7:
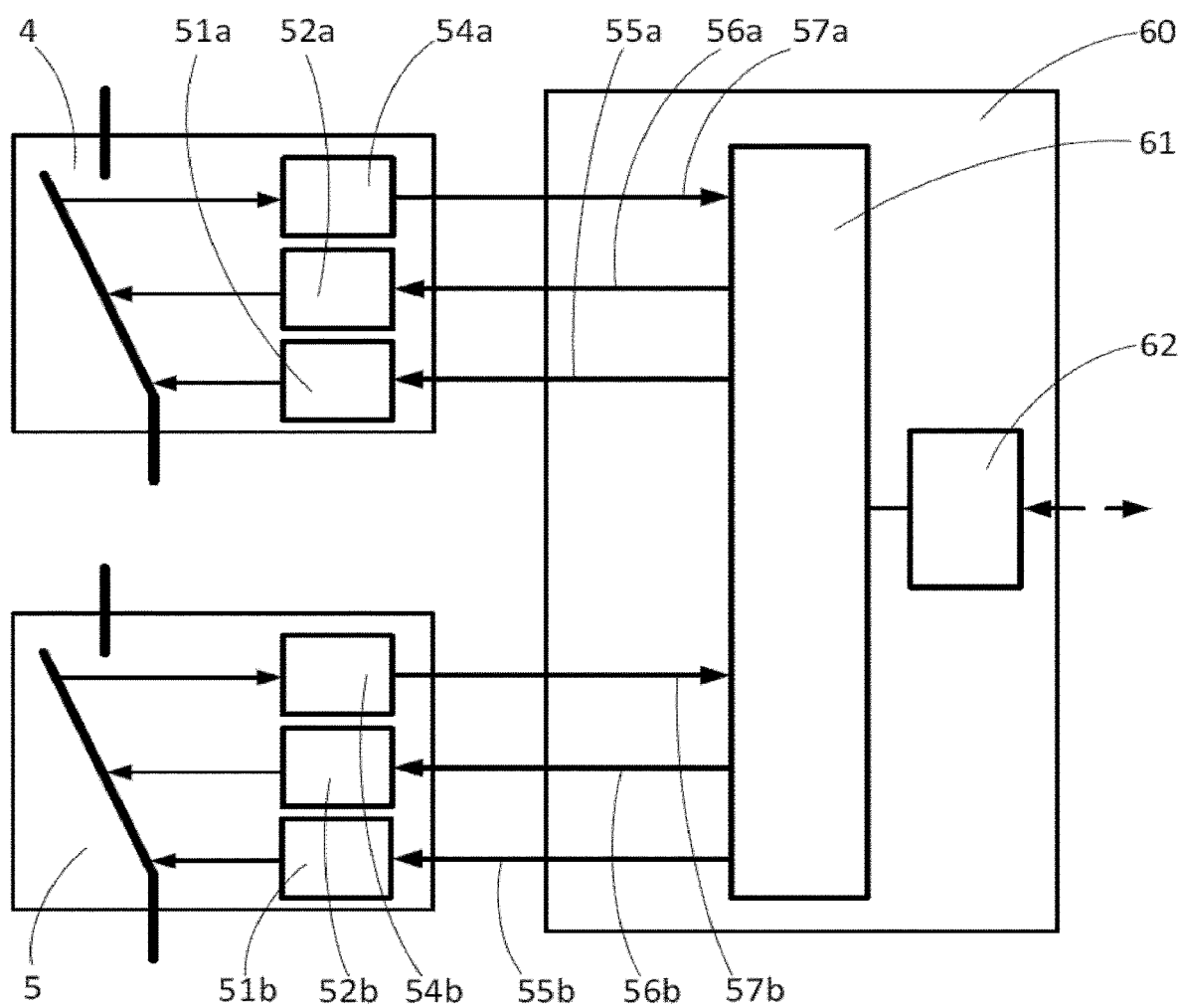
FIG. 7 shows a block diagram of a source inverter showing the input/output connections for implementing the method for commanding two switches.

The invention also relates to a source inverter 60 intended to command at least one first switch 4 and one second switch 5 for connecting, without overlapping, at least two electric power sources 1, 2 to a power distribution line 7. FIG. 7 shows a block diagram of such a source inverter. Said inverter comprises:

at least one first connection 57a connected to a first sensor 54a for receiving a first signal If indicating the closure of the first switch 4 and one second connection 57b connected to a second sensor 54b for receiving a second signal Ifb indicating the closure of the second switch 5;

at least one third connection 56a for commanding a first opening actuator 52a of the first switch 4 and one fourth connection 56b for commanding a second opening actuator 52b of the second switch 5;

at least one fifth connection 55a for commanding a first closure actuator 51a of the first switch 4 and one sixth connection 55b for commanding a second closure actuator 51b of the second switch 5; and a processing unit 61 for implementing the connection method as previously described.

The source inverter 60 optionally can comprise a human-machine interface 62 intended to provide data, for example, relating to the state of the switches, to perform measurements of the average values of the operation duration or to allow an operator to start the source transfer method.

A command for activating an actuator by means of an alternating voltage introduces a random delay related to the phase angle of the alternating voltage at the time of the command. Such a delay, which is included in the operation duration for connecting or disconnecting the first or the second source, would introduce an unwanted variability into the first, second, third and fourth operation durations Tmd1, Tmd2, Tmc1, Tmc2. Activation by a direct voltage eliminates this variability. Preferably, the first opening actuator 52a of the first switch 4, the second opening actuator 52b of the second switch 5, the first closure actuator 51a of the first switch 4 and the second closure actuator 51b of the second switch 5 are activated by a direct voltage. The source inverter 60 transmits a direct voltage over the fifth connection 55a in order to command the first closure actuator 51a of the first switch 4, the source inverter 60 transmits a direct voltage over the sixth connection 55b in order to command the second closure actuator 51b of the second switch 5. The source inverter 60 also transmits a direct voltage over the third connection 56a in order to command the first opening actuator 52a of the first switch 4, and the source inverter 60 also transmits a direct voltage over the fourth connection 56b in order to command the second opening actuator 52b of the second switch 5.

The first electric switch 4 that is intended to be commanded by the source inverter 60 comprises at least:

one upstream connection terminal 12 intended to be connected to a first source 4 or to an electric power line;

one downstream connection terminal 13 intended to be connected to an electric power distribution line 7;

electric contacts 41 for establishing or interrupting the circulation of power between at least the upstream terminal 12 and the downstream terminal 13;

an opening actuator 52a for activating a mechanism 42 for opening the electric contacts 41;

a closure actuator 51a for activating a mechanism 46 for closing the electric contacts 41.

Figure 8:
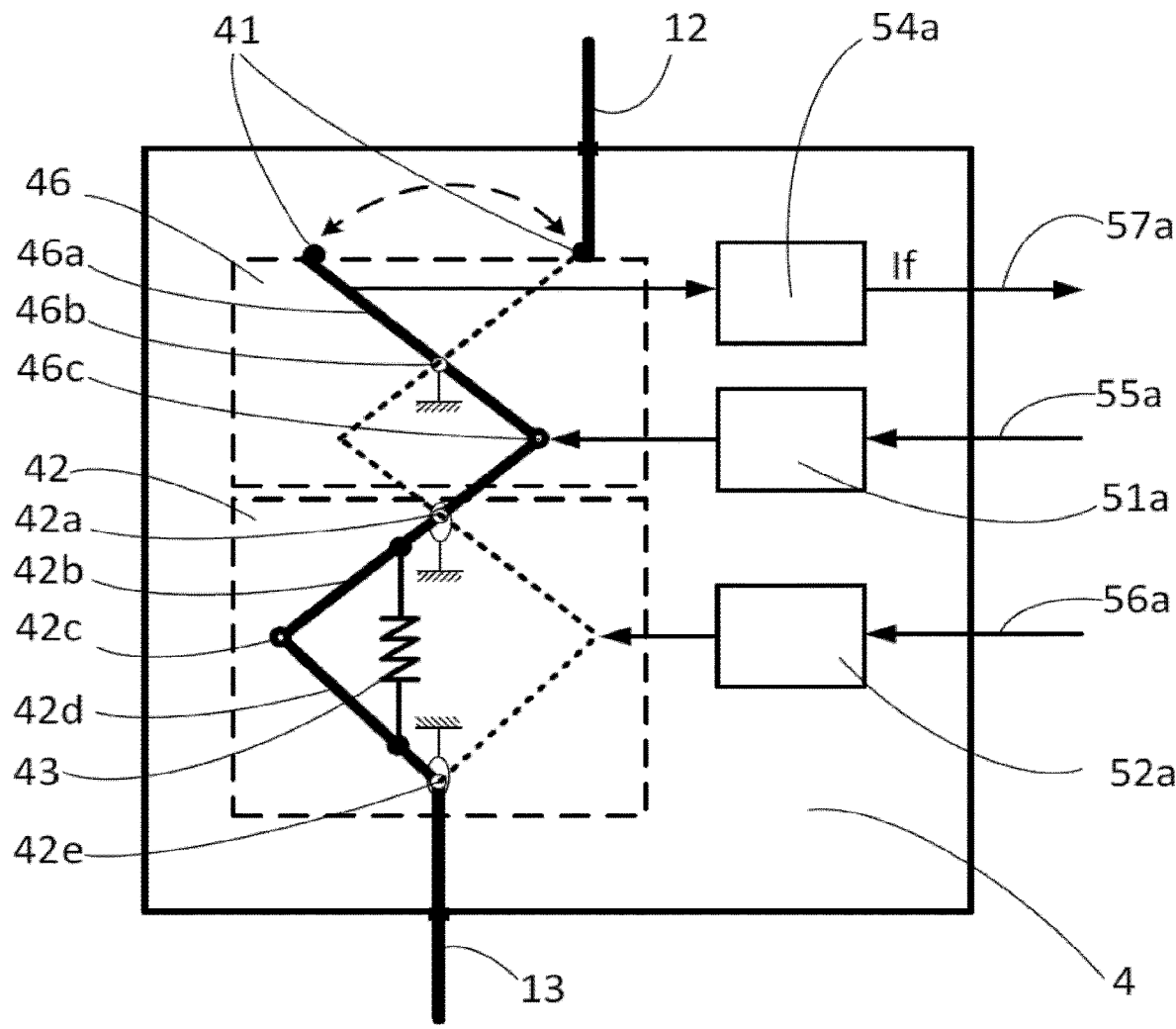
FIG. 8 shows an electric switch in the form of a synoptic diagram for showing the operation of a mechanism for opening and closing electric contacts.

FIG. 8 shows such an electric switch in the form of a synoptic diagram showing the particular arrangement of the mechanisms for opening 42 and closing 46 the electric contacts: the activation of the mechanism 42 for opening the electric contacts acts on the mechanism 46 for closing the contacts in order to interrupt an operation for closing said contacts. This feature allows the step 270 of disconnecting the second source 2 to be executed, given that the closure indicator If has not been delivered during the opening duration Tob of the observation window, whereas an operation for connecting to the second source 2 was previously undertaken in step 230.

The opening mechanism 42 operates following the principle of a first toggle link: it comprises a first part 42b that can move around a first shaft 42a that can move in a first bracket. A first end of said first part 42b supports a first articulation 42c with a second part 42d that can move around a second shaft 42e that can move in a second bracket. The closure mechanism 46 operates following the principle of a second toggle link: a third part 46a that can move around a third shaft 46b supports electric contacts 41 at one of the ends thereof, with the other end supporting a second articulation 46c with the first part 42b. The first closure actuator 51a acts on the third part in the vicinity of the second articulation 46c, in the direction indicated by the arrow, in order to achieve the closure of the electric contacts 41. The first opening actuator 52a acts on the first movable part and the second movable part in the vicinity of the first articulation 42c. The activation of the first opening actuator 52a causes the rotation of the third part 46a in the direction of the opening of the contacts 41. A spring 43 retains the first and the second toggle link in a stable position in the absence of a command to open or close the contacts. The astute arrangement of the first and of the second toggle link thus allows an operation for closing the contacts 41 to be removed when an operation for disconnecting the second source 2 is commanded during a step 270. The opening mechanism 42 and the closing mechanism 46 as previously described are preferred embodiments; however, other mechanical principles allowing removal of the closure of the contacts 41 through an opening command can be used.

The energy transfer method and the source inverter that are the subject matter of the invention can be used on networks comprising single-phase or three-phase sources, without any limitation associated with the frequency of the sources or with the power of the loads to be powered. The energy transfer method and the source inverter that are the subject matter of the invention are, more specifically, adapted to transfer the electric power supply of an electric distribution line, on which motors are connected, from a first source to a second source, without overlapping from one source to another, and while guaranteeing a short and controlled transfer duration. Conventional switches, such as power circuit breakers, can be used, without requiring specific fast operation properties. Under these conditions, the source inverter is produced using standard, economically viable, products, for which the availability of spare service parts is guaranteed. These advantages encourage the industrial use of such a source inverter for mass production.

The invention claimed is:

1. A method for transferring, during a predetermined transfer duration, an electric power supply of an electric distribution line from a first source to a second source, without overlapping of the two sources, wherein a first switch, which is connected, on the one hand, to the first source and, on the other hand, to the distribution line, being commanded to close or open in order to connect or disconnect the first source to/from the distribution line, a second switch, which is connected, on the one hand, to the second source and, on the other hand, to the distribution line, being commanded to close or open in order to connect or disconnect the second source to/from said distribution line, the method comprising:

applying either a first delay time before a command for opening the first switch or applying a second delay time before a command for closing the second switch; and computing the first delay time or the second delay time so that a time interval between a disconnection of the first source and a connection of the second source is equal to the transfer duration.

2. The method according to claim 1, further comprising a step of computing:

an average value of a first operation duration for connecting the first source to the distribution line;

an average value of a second operation duration for connecting the second source to the distribution line;

an average value of a third operation duration for disconnecting the first source from the distribution line; and an average value of a fourth operation duration for disconnecting the second source from the distribution line.

3. The method according to claim 2, wherein the first delay time is applied before the command to open the first switch, when the second operation duration for connecting the second source is greater than a sum of the third operation duration for disconnecting the first source and of the transfer duration.

4. The method according to claim 3, wherein the first delay time is equal to the second operation duration for connecting the second source, less the sum of the third operation duration for disconnecting the first source and of the transfer duration.

5. The method according to claim 2, wherein the second delay time is applied before the command to close the second switch, when the second operation duration for connecting the second source is less than the sum of the third operation duration for disconnecting the first source and of the transfer duration.

6. The method according to claim 5, wherein the second delay time is equal to the sum of the third operation duration for disconnecting the first source and of the transfer duration, less the second operation duration for connecting the second source.

7. The method according to claim 1, wherein the transfer duration is between 10 ms and 50 ms.

8. The method according to claim 1, wherein an observation window of a predetermined observation duration is opened at the same time as the command to close the second switch.

9. The method according to claim 8, wherein the opening of the second switch is commanded when a closure indicator of the second switch is not delivered during the observation duration.

10. The method according to claim 9, wherein the closure indicator of the second switch is delivered during execution of a movement to close contacts of said second switch.

11. The method according to claim 9, characterized in that the closure indicator of the second switch is delivered when contacts of said second switch are closed.

12. The method according to claim 9, wherein the closure indicator of the second switch is delivered when contacts of said second switch are no longer open.

13. A source inverter intended to command at least one first switch and one second switch for transferring, during a predetermined transfer duration, without overlapping, the electric power supply of a power distribution line from a first source to a second source, the first switch comprising at least:

one first closure actuator for commanding a closure operation of the first switch;

one first opening actuator for commanding an opening operation of the first switch; and one first sensor for supplying a first signal indicating the closure of the first switch, the second switch comprising at least:

one second closure actuator for commanding a closure operation of the second switch;

one second opening actuator; and one second sensor for supplying a second signal indicating the closure of the second switch, the source inverter comprising:

at least one first connection connected to the first sensor for receiving a first signal indicating the closure of the first switch and one second connection for receiving a second signal indicating the closure of the second switch;

at least one third connection for commanding the first opening actuator and one fourth connection for commanding the second opening actuator;

at least one fifth connection for commanding the first closure actuator for commanding the second closure actuator; and a processing unit configured to apply either a first delay time before a command for opening the first switch or applying a second delay time before a command for closing the second switch, and compute the first delay time or the second delay time so that a time interval between a disconnection of the first source and a connection of the second source is equal to the transfer duration.

14. The source inverter according to claim 13, wherein the first and second closure actuators of the first and second switches are activated by a direct voltage and in that the source inverter.

15. The source inverter according to claim 13, wherein the first and second opening actuators of the first and second switches are activated by a direct voltage and the source inverter transmits a direct voltage over the third and fourth connections for respectively commanding the first and second opening actuators of the first and of the second switch.

16. An electric switch intended to be commanded by a source inverter according to claim 13, said electric switch comprising at least:

one upstream connection terminal intended to be connected to a source supplying electric power;

one downstream connection terminal intended to be connected to an electric power distribution line;

electric contacts for establishing or interrupting the circulation of power between at least the upstream terminal and the downstream terminal;

for activating a mechanism for opening the electric contacts;

a closure actuator for activating a mechanism for closing the electric contacts;

said electric switch being characterized in that the activation of the mechanism for opening the electric contacts acts on the mechanism for closing the contacts in order to interrupt a closure movement of said contacts.

* * * * *